(12) United States Patent
Shin et al.

(10) Patent No.: US 12,394,836 B2
(45) Date of Patent: Aug. 19, 2025

(54) BATTERY PACK HAVING COOLING UNIT PROVIDED OUTSIDE CASE

(71) Applicant: LG Energy Solution, Ltd., Seoul (KR)

(72) Inventors: Ju Hwan Shin, Daejeon (KR); Soon Chang Hong, Daejeon (KR); So Eun Rhim, Daejeon (KR); Hyoung Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 469 days.

(21) Appl. No.: 17/790,614

(22) PCT Filed: Apr. 26, 2021

(86) PCT No.: PCT/KR2021/005214
§ 371 (c)(1),
(2) Date: Jul. 1, 2022

(87) PCT Pub. No.: WO2021/235716
PCT Pub. Date: Nov. 25, 2021

(65) Prior Publication Data
US 2023/0042629 A1 Feb. 9, 2023

(30) Foreign Application Priority Data

May 20, 2020 (KR) ........................ 10-2020-0060598

(51) Int. Cl.
*H01M 10/613* (2014.01)
*H01M 10/653* (2014.01)
(Continued)

(52) U.S. Cl.
CPC ..... *H01M 10/6556* (2015.04); *H01M 10/613* (2015.04); *H01M 10/653* (2015.04);
(Continued)

(58) Field of Classification Search
CPC ............. H01M 10/613; H01M 10/653; H01M 10/6556; H01M 10/6568; H01M 50/204
See application file for complete search history.

(56) References Cited

U.S. PATENT DOCUMENTS

| 2014/0023906 A1 | 1/2014 | Hashimoto et al. |
| 2014/0205878 A1 | 7/2014 | Ohgitani et al. |

(Continued)

FOREIGN PATENT DOCUMENTS

| CN | 109244308 A | 1/2019 |
| CN | 110945713 A | 3/2020 |

(Continued)

OTHER PUBLICATIONS

Clarivate Analytic machine translation of CN 109244308 A (Year: 2019).*

(Continued)

*Primary Examiner* — Kevin E Yoon
(74) *Attorney, Agent, or Firm* — Lerner David LLP

(57) ABSTRACT

The present invention relates to a battery pack having a cooling unit provided outside a pack case, and more particularly a battery pack including a battery module (100) including one or more unit cells; a case (200) having a receiving portion configured to receive the battery module (100); a cooling unit (300) located at an outer bottom surface of the case (200); and a reinforcement member (400) configured to protect the cooling unit (300).

12 Claims, 7 Drawing Sheets

(51) Int. Cl.
  *H01M 10/6551*   (2014.01)
  *H01M 10/6556*   (2014.01)
  *H01M 10/6568*   (2014.01)
  *H01M 10/6569*   (2014.01)
  *H01M 50/204*    (2021.01)

(52) U.S. Cl.
  CPC ... *H01M 10/6551* (2015.04); *H01M 10/6569* (2015.04); *H01M 50/204* (2021.01)

(56) References Cited

U.S. PATENT DOCUMENTS

| | | | |
|---|---|---|---|
| 2016/0079640 | A1 | 3/2016 | Kim |
| 2017/0021740 | A1* | 1/2017 | Brendecke ............ B60L 58/26 |
| 2017/0025655 | A1 | 1/2017 | Klimek et al. |
| 2018/0019508 | A1 | 1/2018 | Lee et al. |
| 2018/0151930 | A1 | 5/2018 | Kim et al. |
| 2020/0067038 | A1 | 2/2020 | Chi et al. |
| 2020/0112000 | A1 | 4/2020 | Kwag |
| 2020/0119416 | A1 | 4/2020 | Kim et al. |
| 2020/0127346 | A1 | 4/2020 | Noda |
| 2020/0180417 | A1 | 6/2020 | Marquez Duran et al. |
| 2021/0151818 | A1 | 5/2021 | Becker et al. |
| 2021/0167442 | A1 | 6/2021 | Becker et al. |
| 2021/0167445 | A1* | 6/2021 | Becker ............ H01M 10/6568 |

FOREIGN PATENT DOCUMENTS

| | | | |
|---|---|---|---|
| DE | 102015111749 | A1 | 1/2017 |
| DE | 102018216833 | A1 | 4/2020 |
| JP | 2013084444 | A | 5/2013 |
| JP | 2014139895 | A | 7/2014 |
| JP | 2016029624 | A | 3/2016 |
| KR | 20160030724 | A | 3/2016 |
| KR | 101783515 | B1 | 9/2017 |
| KR | 101865995 | B1 | 6/2018 |
| KR | 20180061702 | A | 6/2018 |
| KR | 20180081996 | A | 7/2018 |
| KR | 20180119990 | A | 11/2018 |
| KR | 20180133729 | A | 12/2018 |
| KR | 20200001705 | A | 1/2020 |
| KR | 20200015207 | A | 2/2020 |
| KR | 20200040024 | A | 4/2020 |
| KR | 20200042341 | A | 4/2020 |
| WO | 2012133708 | A1 | 10/2012 |
| WO | 2019020772 | A1 | 1/2019 |
| WO | 2019197340 | A1 | 10/2019 |
| WO | WO-2019197335 | A1 * | 10/2019 ............ B60K 6/28 |

OTHER PUBLICATIONS

International Search Report for Application No. PCT/KR2021/005214 mailed Aug. 2, 2021, pp. 1-2.

Search Report dated Feb. 24, 2023 from the Office Action for Chinese Application No. 202180009641.1 Issued May 27, 2024, pp. 1-3.

Extended European Search Report including Written Opinion for Application No. 21809484.5 dated Apr. 26, 2024, pp. 1-7.

* cited by examiner

PRIOR ART
[FIG. 1]
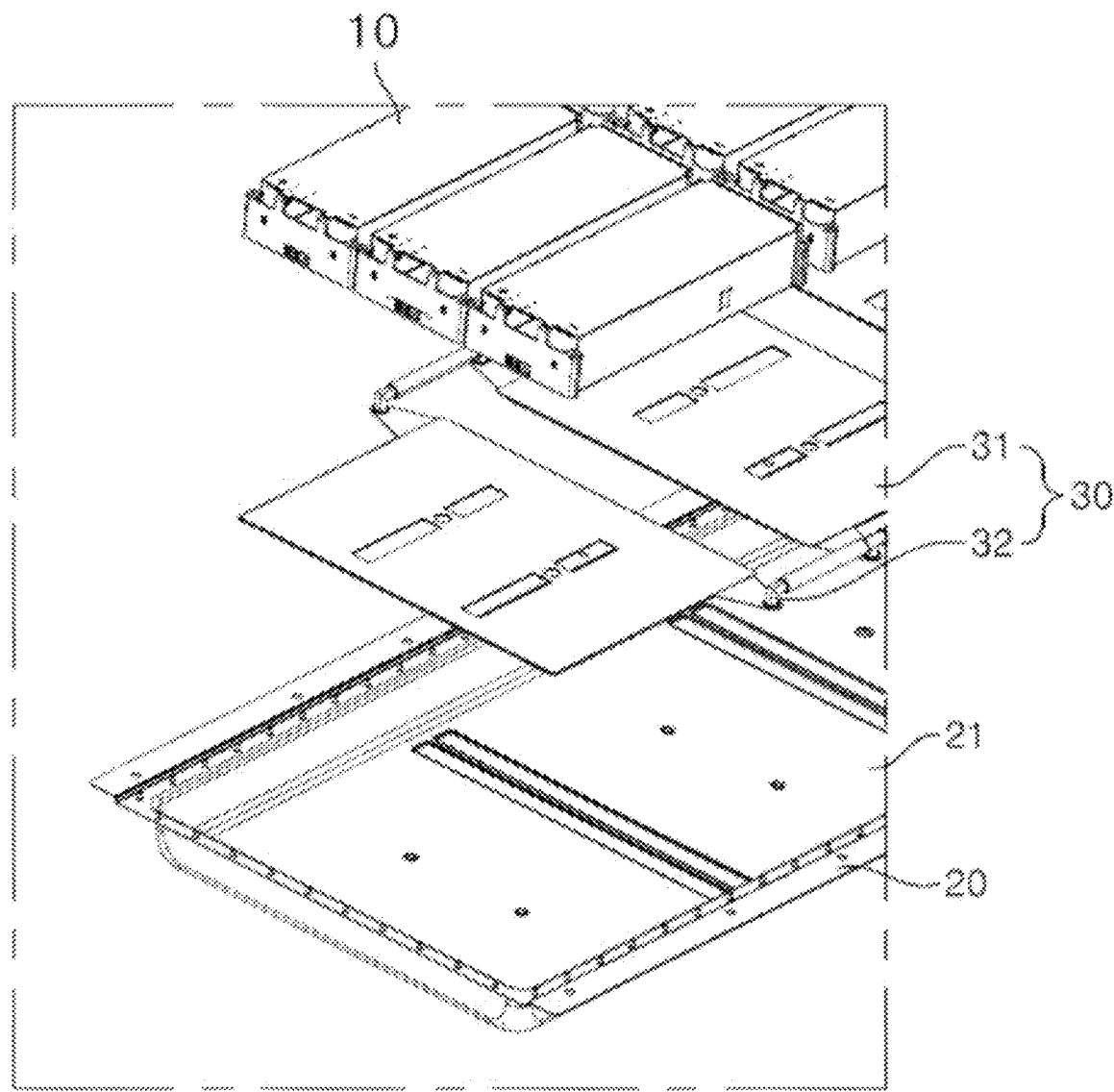

[FIG. 2]
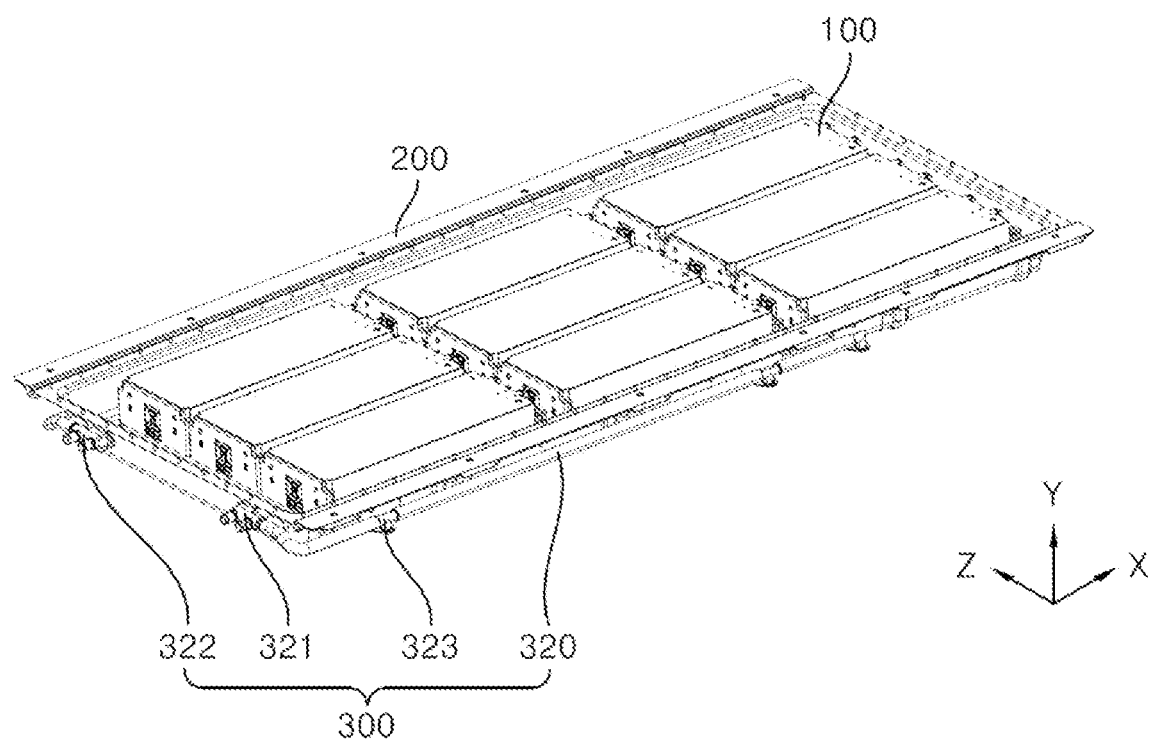

[FIG. 3]
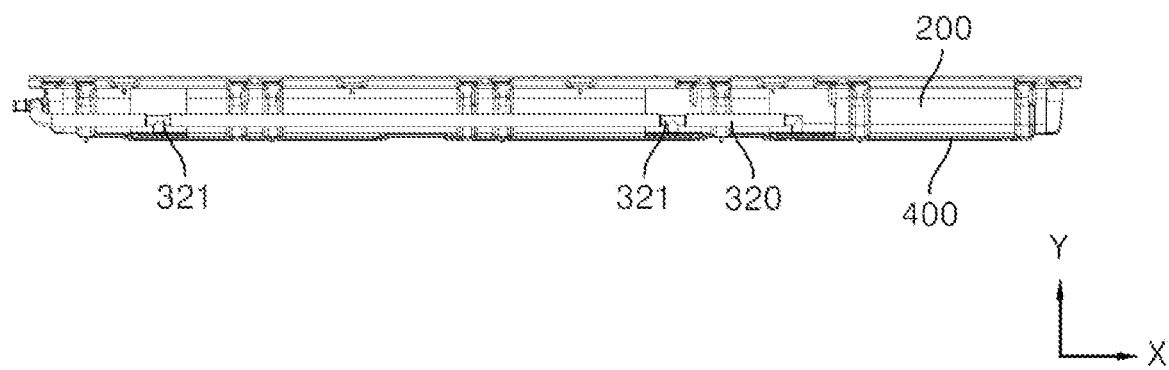
[FIG. 4]
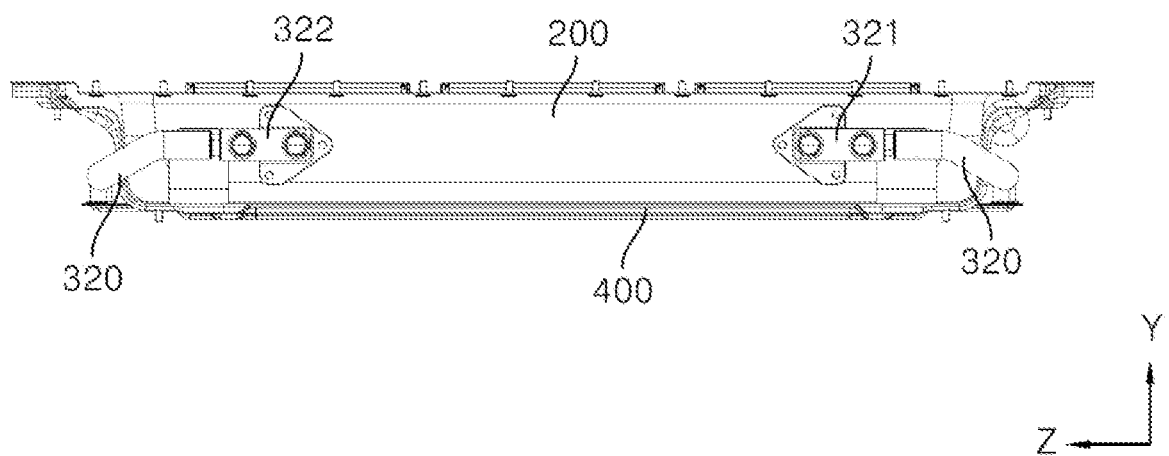

[FIG. 5]
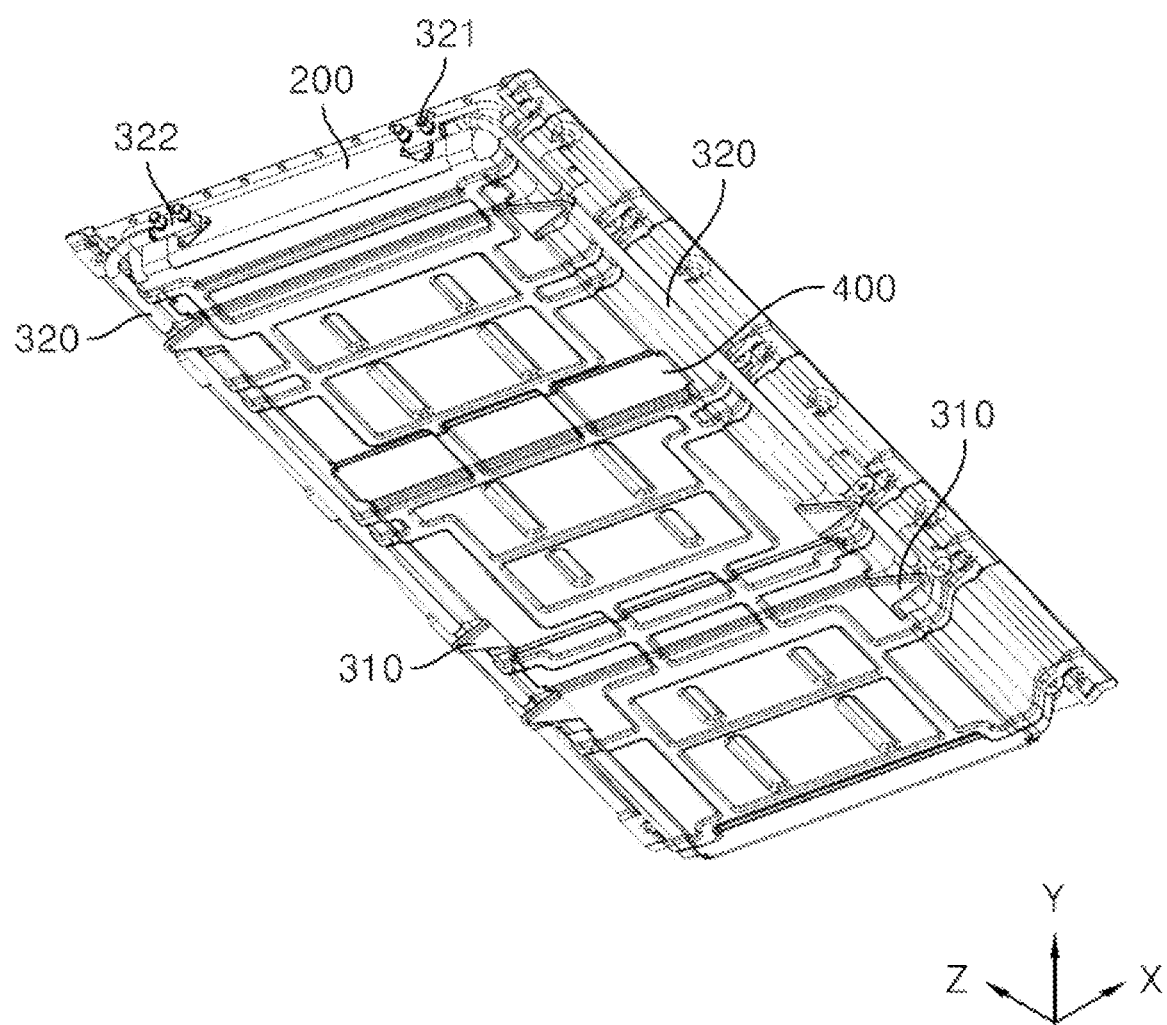

[FIG. 6]
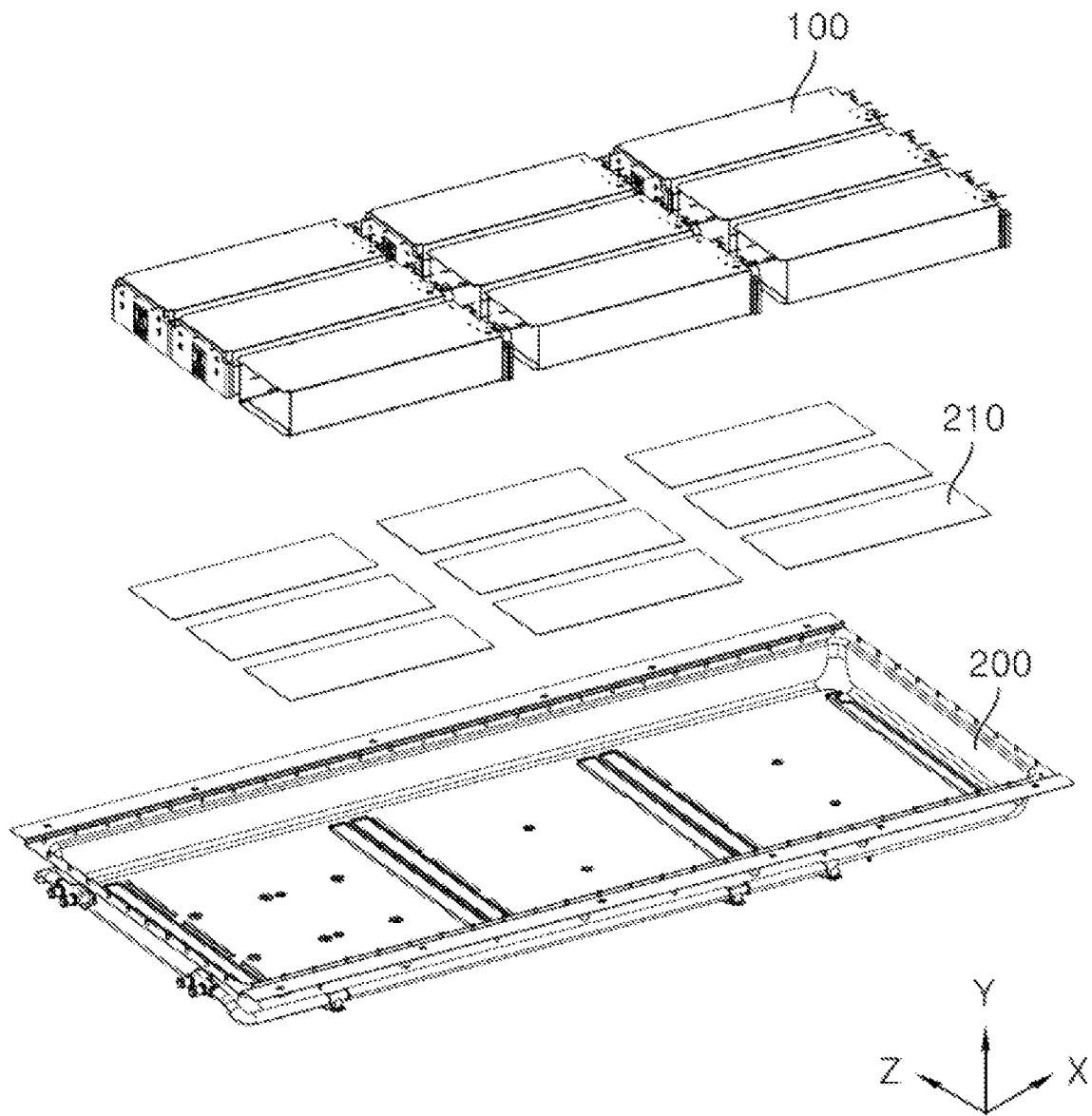

[FIG. 7]
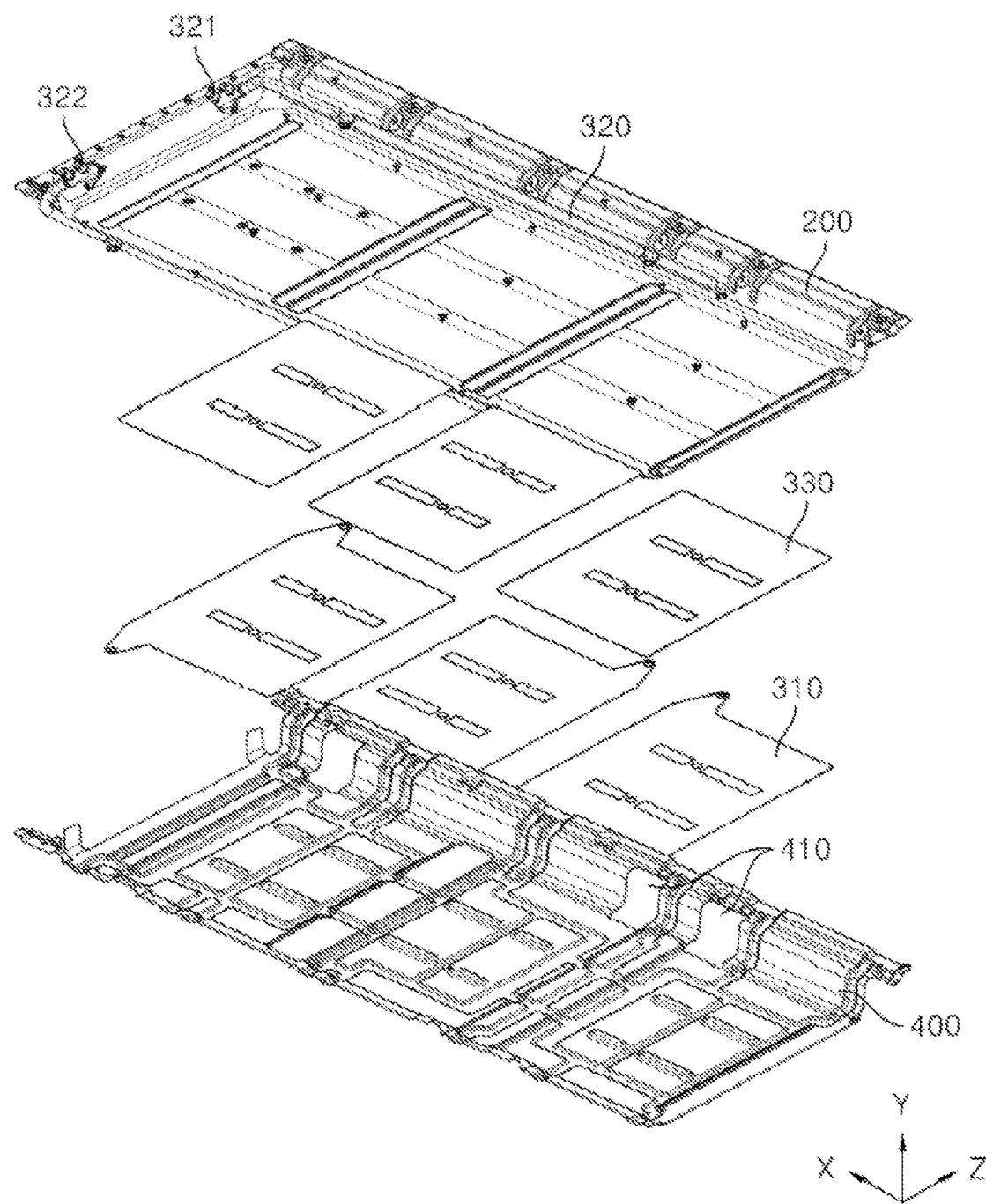

[FIG. 8]
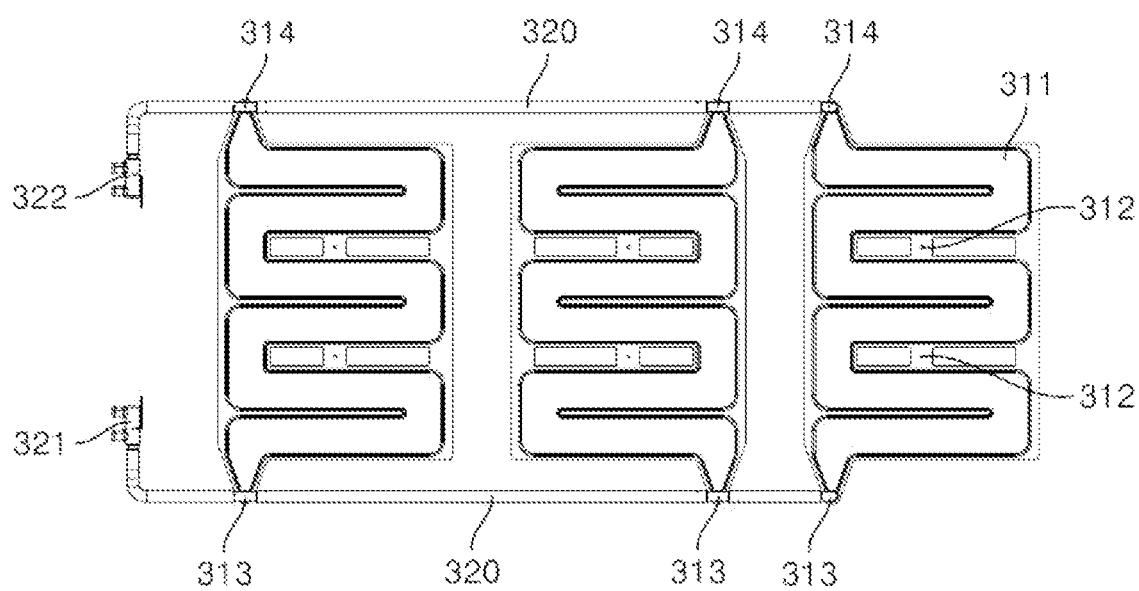

BATTERY PACK HAVING COOLING UNIT PROVIDED OUTSIDE CASE

CROSS-REFERENCE TO RELATED APPLICATIONS

The present application is a national phase entry under 35 U.S.C. § 371 of International Application No. PCT/KR2021/005214 filed on Apr. 26, 2021, which claims the benefit of priority to Korean Patent Application No. 10-2020-0060598 filed on May 20, 2020, the disclosure of which is incorporated herein by reference in its entirety.

TECHNICAL FIELD

The present invention relates to a battery pack having a cooling unit provided outside a pack case, and more particularly to a battery pack having a cooling unit provided outside a case configured such that a cooling unit configured to dissipate heat generated in a battery module is provided outside a case and such that a reinforcement case configured to protect the cooling unit is further provided, whereby it is possible to fundamentally prevent occurrence of an event due to outflow of a refrigerant.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

In the battery module or the battery pack, a plurality of battery cells is connected to each other in series or in parallel in order to increase capacity and output of the battery module or the battery pack. In the case in which a plurality of battery cells is used in a state of being connected to each other, a problem, such as overload, may occur. In particular, for the battery pack, a battery module including a plurality of battery cells is located in a case. As a result, there is a problem in that temperature in the battery pack increases due to overload, whereby abnormality of the battery is amplified. In order to solve this problem, a general battery pack has a cooling unit capable of lowering temperature in the battery, whereby safety of the battery is improved.

FIG. 1 is an exploded perspective view of a conventional battery pack. As shown in FIG. 1, the conventional battery pack includes a battery module 10, a case 20 having a receiving portion 21 configured to receive the battery module therein, and a cooling unit 30 located between the battery module 10 and the case 20, i.e. in the receiving portion 21. The cooling unit 30 includes a heat sink 31 disposed in contact with the battery module 10 so as to lower temperature of the battery module 10 and a refrigerant circulation pipe 32 configured to supply a refrigerant to the heat sink 31.

In the conventional battery pack, the cooling unit 30 is disposed in the case 20. When the refrigerant flows out of the heat sink 31 or the refrigerant circulation pipe 32, therefore, the battery pack is affected, whereby safety of the battery pack is deteriorated. Furthermore, since the heat sink 31 or the refrigerant circulation pipe 32 is located in the case 20, it is difficult to replace the heat sink or the refrigerant circulation pipe even in the case in which the heat sink or the refrigerant circulation pipe is defective.

In Patent Document 1, a heat sink mounted outside a module case is mentioned. However, this document relates to a battery module and does not mention a heat sink or a refrigerant circulation pipe provided outside a pack case so as to be replaceable.

Prior Art Document (Patent Document 1) Korean Patent Application Publication No. 2018-0119990 (2018.11.05)

Technical Problem

The present invention has been made in view of the above problems, and it is an object of the present invention to provide a battery pack configured such that outflow of a refrigerant from the battery pack is prevented, whereby performance and safety of the battery are improved.

It is another object of the present invention to provide a battery pack configured such that, when a cooling unit is defective or damaged, part replacement is easily performed, whereby maintenance and repair is easily achieved.

Technical Solution

In order to accomplish the above objects, a battery pack according to the present invention includes a battery module (100) including one or more unit cells; a case (200) having a receiving portion configured to receive the battery module (100); a cooling unit (300) located at an outer bottom surface of the case (200); and a reinforcement member (400) configured to protect the cooling unit (300).

The cooling unit (300) may include a heat sink (310) having a cooling channel (311) defined therein and a refrigerant circulation pipe (320) having a refrigerant introduction port (321) configured to supply a refrigerant to the heat sink (310) and a refrigerant discharge port (322) configured to collect the refrigerant from the heat sink (310).

The cooling unit (300) may be fixed to the case (200) via an adhesive member (330).

The adhesive member (330) may be made of a thermally conductive material.

The refrigerant circulation pipe (320) may further have a fastening portion (312) configured to allow the refrigerant circulation pipe to be coupled to the case (200).

A heat dissipation plate (210) configured to transfer heat generated from the battery module (100) to the case (200) may be located at the bottom surface of the receiving portion of the case (200).

The refrigerant circulation pipe (320) may be located outside the reinforcement member (400).

The reinforcement member (400) may be in tight contact with the outer bottom surface and a pair of opposite side surfaces of the case (200).

The reinforcement member (400) may be provided with a plurality of openings (410).

A refrigerant inlet (313) and a refrigerant outlet (314) connected to the refrigerant circulation pipe (320) may be formed at opposite ends of the heat sink (310), and the refrigerant inlet (313) and the refrigerant outlet (314) may be located in a state of protruding outwards through the openings (410).

A branch pipe (323) may be located between the refrigerant inlet (313) of the heat sink (310) and the refrigerant circulation pipe (320) and between the refrigerant outlet (314) and the refrigerant circulation pipe (320).

The refrigerant introduction port (321) and the refrigerant discharge port (322) may be directly fixed to the case (200).

The present invention may provide a device having mounted therein the battery pack having one or more of the constructions that do not conflict with each other mentioned above.

In the present invention, one or more constructions that do not conflict with each other may be selected and combined from the above among constructions.

Advantageous Effects

As is apparent from the above description, a battery pack having a cooling unit provided outside a case according to the present invention has an advantage in that the cooling unit is located outside the case, whereby performance of the battery pack is not affected even in the case in which a refrigerant for cooling flows out of the cooling unit, and therefore safety of the battery pack is improved.

In addition, the battery pack having the cooling unit provided outside the case according to the present invention has a merit in that a reinforcement member configured to cover the cooling unit is further provided, whereby it is possible to safely protect the cooling unit from external impact.

Furthermore, the battery pack having the cooling unit provided outside the case according to the present invention has an advantage in that the reinforcement member is provided with a plurality of openings configured to allow portions that connect a refrigerant circulation pipe and a refrigerant inlet and outlet of a heat sink to each other to be exposed therethrough, whereby it is possible to easily check leakage of the refrigerant without separation of the entirety of the reinforcement member or to easily replace the heat sink or the refrigerant circulation pipe.

DESCRIPTION OF DRAWINGS

FIG. 1 is an exploded perspective view of a conventional battery pack.

FIG. 2 is a perspective view of a battery pack according to a preferred embodiment of the present invention.

FIG. 3 is a view of the battery pack shown in FIG. 2 when viewed from one side.

FIG. 4 is a view of the battery pack shown in FIG. 2 when viewed from the front.

FIG. 5 is a view of the battery pack shown in FIG. 2 when viewed from below.

FIG. 6 is an exploded view of the upper part of a case in the battery pack shown in FIG. 2.

FIG. 7 is an exploded view of the lower part of the case in the battery pack shown in FIG. 2.

FIG. 8 is an enlarged sectional view of a heat sink mounted to the battery pack shown in FIG. 2.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

FIG. 2 is a perspective view of a battery pack according to a preferred embodiment of the present invention, FIG. 3 is a view of the battery pack shown in FIG. 2 when viewed from one side, FIG. 4 is a view of the battery pack shown in FIG. 2 when viewed from the front, and FIG. 5 is a view of the battery pack shown in FIG. 2 when viewed from below.

The battery pack according to the present invention includes a battery module 100 including one or more unit cells, a case 200 having a receiving portion configured to receive the battery module 100, a cooling unit 300 located at the outer bottom surface of the case 200, and a reinforcement member 400 configured to protect the cooling unit 300.

When describing the case 200 first, the receiving portion, which is formed so as to receive the battery module 100 including the one or more unit cells (not shown), is surrounded by a side wall.

Here, each unit cell may include an electrode assembly and a cell case configured to receive the electrode assembly. The electrode assembly may be a (1) jelly-roll type electrode assembly, which is configured to have a structure in which a long sheet type positive electrode and a long sheet type negative electrode are wound in the state in which a separator is interposed therebetween, (2) a stacked type electrode assembly including unit cells, each of which is configured to have a structure in which a rectangular positive electrode and a rectangular negative electrode are stacked in the state in which a separator is interposed therebetween, (3) a stacked and folded type electrode assembly, which is configured to have a structure in which unit cells are wound using a long separation film, or (4) a laminated and stacked type electrode assembly, which is configured to have a structure in which unit cells are stacked in the state in which a separator is interposed therebetween and are then attached to each other. However, the present invention is not limited thereto. It is preferable for the electrode assembly according to the present invention to be a stacked and folded type electrode assembly or a laminated and stacked type electrode assembly, which has lowest physical stress when a curved module is formed.

The electrode assembly is received in the cell case. The cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Although not shown, a cover may be mounted to the upper part of the case 200. That is, the cover may be fixed to the case 200 via a well-known coupling means, such as bolting or welding, in the state in which the cover is seated on the upper part of the case. At this time, the surface of the case 200 that comes into contact with the cover may extend for secure coupling or easy mounting to an external device.

Meanwhile, the case 200 may have a partitioned structure in which battery modules 100 remain spaced apart from each other by a predetermined distance or may have a concave-convex structure in which heat dissipation is easily achieved while the strength of the case 200 is improved.

In the battery pack according to the present invention, the cooling unit 300 is located at the outer bottom surface of the case 200. Specifically, the cooling unit 300 includes a heat sink 310 having a cooling channel defined therein, a refrigerant circulation pipe 320 having a refrigerant introduction port 321 configured to supply a refrigerant to the heat sink 310 and a refrigerant discharge port 322 configured to collect the refrigerant that has been circulated, and an adhesive member 330 configured to fix the refrigerant circulation pipe 320 to the outer bottom surface of the case 200 and to accelerate heat transfer between the case 200 and the heat sink 310. The cooling unit 300 will be described below in more detail.

Next, the reinforcement member 400, which protects the cooling unit 300 including the heat sink 310, will be described.

The shape of the reinforcement member 400 is not particularly restricted as long as it is possible to protect the heat sink 310 of the cooling unit. As an example, the reinforcement member may be configured to wrap the outer bottom surface of the case 200 and a longer one of two pairs of opposite side surfaces of the case. That is, the reinforcement member 400 may be located so as to be brought into tight contact with the outer bottom surface of the case 200 and one pair of opposite side surfaces of the case. At this time, the case 200 and the reinforcement member 400 may be fixed to each other via a well-known fastening means, such as spot welding or screwing.

Meanwhile, it is preferable for a portion of the heat sink 310 and the refrigerant circulation pipe 320 to be exposed outside the reinforcement member 400, which will be described below.

FIG. 6 is an exploded view of the upper part of the case in the battery pack shown in FIG. 2. Referring to FIG. 6, the battery pack according to the present invention is configured such that a heat dissipation plate 210 is located on the bottom surface of the case 200, which is the receiving portion, i.e. between the battery module 100 and the bottom surface of the case, in order to transfer heat generated from the battery module 100 to the bottom surface of the case 200. At this time, the heat transferred to the bottom surface of the case 200 may be transferred to the heat sink provided outside the case, whereby it is possible to maintain temperature of the pack at a battery predetermined temperature or lower.

Here, as shown in FIG. 6, the heat dissipation plate 210 may be configured as a member other than the case 200 and may be located between the battery module 100 and the case 200, or may be integrally formed with the upper part of the bottom surface of the case 200 or the bottom surface of the battery module 100, as needed.

FIG. 7 is an exploded view of the lower part of the case in the battery pack shown in FIG. 2, and FIG. 8 is an enlarged sectional view of the heat sink mounted to the battery pack shown in FIG. 2.

When describing with reference to FIGS. 5, 7, and 8, the cooling unit 300 and the reinforcement member 400 are sequentially located at the lower part of the case 200 of the battery pack according to the present invention.

More specifically, the cooling unit 300 includes at least one heat sink 310 formed so as to have an approximately flat shape, a refrigerant circulation pipe 320, and an adhesive member 330. The heat sink 310 includes a cooling channel 311 formed so as to have a zigzag shape such that the refrigerant is circulated as uniformly as possible, a refrigerant inlet 313 configured to receive the refrigerant that flows in the refrigerant circulation pipe 320, the refrigerant inlet being connected to one side of the cooling channel 311, and a refrigerant outlet 314 configured to discharge the refrigerant that has been elevated in temperature through heat absorption, the refrigerant outlet 314 being connected to the other side of the cooling channel 311.

Here, the refrigerant inlet 313 and the refrigerant outlet 314 may be located at opposite ends of the heat sink 310 so as to face each other. As a result, it is possible to reduce the movement distance of the refrigerant that flows into or out of the refrigerant circulation pipe 320 by adjusting the positions of the refrigerant inlet 313 and the refrigerant outlet 314 in the battery pack.

Meanwhile, reference numeral 312 indicates a fastening portion, which provides a space in which a well-known fixing means, such as a bolt and a nut, can be located when the heat sink 310 is fixed to the case 200. Three heat sinks 310 are shown in the drawings, which, however, is merely an illustration. It is possible to increase or decrease the number of the heat sinks.

The refrigerant circulation pipe 320, which is configured to supply the refrigerant to the refrigerant inlet 313 of the heat sink 310 and to guide the refrigerant that flows out of the refrigerant outlet 314, is formed so as to wrap a portion of the contour of the case 200 therealong, and has generally an "L" shape.

The heat sink 310 includes a refrigerant introduction port 321 configured to allow a refrigerant cooled to a predetermined temperature to be supplied therethrough, a refrigerant discharge port 322 configured to allow the refrigerant that has passed through the heat sink 310 to be discharged therethrough, and a branch pipe 323 configured to connect each heat sink 310 and the refrigerant circulation pipe 320 to each other.

Here, it is preferable for the branch pipe 323 to be identical in number to the refrigerant inlet 313 and the refrigerant outlet 314 of the heat sink 310. As a result, it is possible to selectively replace only the heat sink 310 that is defective, whereby it is possible to reduce maintenance and repair expenses.

Meanwhile, the refrigerant introduction port 321 and the refrigerant discharge port 322 may be fastened to one surface of the case 200, and the branch pipe 323 of the refrigerant circulation pipe 320 may be connected to the sink heat 310, whereby the refrigerant circulation pipe 320 may be securely fixed to the case 200.

It is preferable for each of the heat sink 310 and the refrigerant circulation pipe 320 to be made of a material that is capable of easily transferring heat. As an example, each of the heat sink and the refrigerant circulation pipe may be made of aluminum, which has excellent thermal conductivity.

The adhesive member 330, which is interposed between the outer bottom surface of the case 200 and the heat sink 310, prevents separation between the case 200 and the heat sink 310 in order to maximize heat transfer efficiency, in addition to a function of coupling the case and the heat sink to each other.

The material of the adhesive member 330 is not particularly restricted as long as the adhesive member has excellent thermal conductivity and sufficient adhesive force. As an example, the adhesive member may be made of a resin, such as silicone, epoxy, polyurethane, acrylic, a phenol resin, polyester, or glass frit. As needed, metal particles, such as silver, copper, nickel, silver-lead, or silver-copper, or carbon particles may be additionally included in the above-mentioned resin.

The reinforcement member 400, which is located under the cooling unit 300 and which is configured to protect the heat sink 310 and the refrigerant circulation pipe 320 from external impact, has generally a "U" shape and extends from the bottom surface of the heat sink 310 to the side surface of the case 200.

In particular, the reinforcement member 400 is provided in the side surface thereof with one or more openings 410, specifically openings 410 identical in number to the refrigerant inlet 313 and the refrigerant outlet 314 of the heat sink 310. As a result, the refrigerant inlet 313 and the refrigerant outlet 314 of the heat sink 310 are connected to the branch pipe 323 in a state of protruding through the openings 410, and therefore it is possible to observe abnormality without separation of the reinforcement member 400 and furthermore to very easily achieve maintenance and repair.

Meanwhile, the reinforcement member 400 may be configured to have a concave-convex structure made of a metal material that exhibits excellent thermal conductivity, whereby the reinforcement member has high resistance to external impact and natural heat dissipation is easily achieved.

Of course, the reinforcement member 400 may be fixed to the side surface of the case 200 or a flange portion via a well-known fixing means, such as bolting or welding.

Hereinafter, a method of manufacturing the battery pack according to the present invention having the above-described constructions will be briefly described.

The method of manufacturing the battery pack according to the present invention may include S1) a step of receiving a battery module 100 including one or more unit cells in a receiving portion of a case 200, S2) a step of attaching a cooling unit 300 to the outer bottom surface of the case 200, and S3) a step of mounting a reinforcement member 400 to the outside of the cooling unit 300.

Meanwhile, in step S1), a step of disposing a heat dissipation plate 210 between the battery module 100 and the bottom surface of the case 200 may be further performed.

The present invention may provide a device having mounted therein the battery pack having at least one of the characteristics described above. The device may be an electronic device including a large-capacity battery, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE NUMERALS

10, 100: Battery modules
20, 200: Cases
21: Receiving portion
210: Heat dissipation plate
30, 300: Cooling units
31, 310: Heat sinks
311: Cooling channel 312: Fastening portion
313: Refrigerant inlet 314: Refrigerant outlet
32, 320: Refrigerant circulation pipes
321: Refrigerant introduction port
322: Refrigerant discharge port
323: Branch pipe
330: Adhesive member
400: Reinforcement member
410: Opening

The invention claimed is:

1. A battery pack comprising:
a battery module comprising one or more unit cells;
a case including a receiving portion configured to receive the battery module;
a cooling unit disposed on a first outer surface of the case; and
a reinforcement member configured to protect the cooling unit,
wherein the cooling unit comprises a refrigerant circulation pipe disposed outside the reinforcement member, the reinforcement member contacting a pair of opposing surfaces of the case and defining an opening in at least one of the pair of opposing surfaces.

2. The battery pack according to claim 1, wherein the cooling unit comprises:
a heat sink defining a cooling channel; and
wherein the refrigerant circulation pipe includes a refrigerant introduction port configured to supply a refrigerant to the heat sink and a refrigerant discharge port configured to collect the refrigerant from the heat sink.

3. The battery pack according to claim 2, wherein the cooling unit is coupled to the case via an adhesive member.

4. The battery pack according to claim 3, wherein the adhesive member is formed of a thermally conductive material.

5. The battery pack according to claim 4, wherein the refrigerant circulation pipe includes a fastening portion configured to couple the refrigerant circulation pipe to the case.

6. The battery pack according to claim 1, further comprising a heat dissipation plate disposed between the battery module and the case, the heat dissipation plate configured to transfer heat generated from the battery module to the case.

7. The battery pack according to claim 1, wherein the reinforcement member contacts the first outer surface and the pair of opposing surfaces of the case.

8. The battery pack according to claim 7, wherein the reinforcement member defines a plurality of openings.

9. The battery pack according to claim 8, wherein a refrigerant inlet and a refrigerant outlet coupled to the refrigerant circulation pipe are positioned at opposite ends of the heat sink, and wherein the refrigerant inlet and the refrigerant outlet protrude through the plurality of openings.

10. The battery pack according to claim 9, wherein a branch pipe is disposed between the refrigerant inlet of the heat sink and the refrigerant circulation pipe and between the refrigerant outlet and the refrigerant circulation pipe.

11. The battery pack according to claim 10, wherein the refrigerant introduction port and the refrigerant discharge port are directly fixed to the case.

12. A device having the battery pack according to claim 1 mounted therein.

* * * * *